No. 654,929. Patented July 31, 1900.
C. WOLFF.
APPARATUS FOR CUTTING GLUE.
(Application filed Nov. 17, 1899.)
(No Model.)
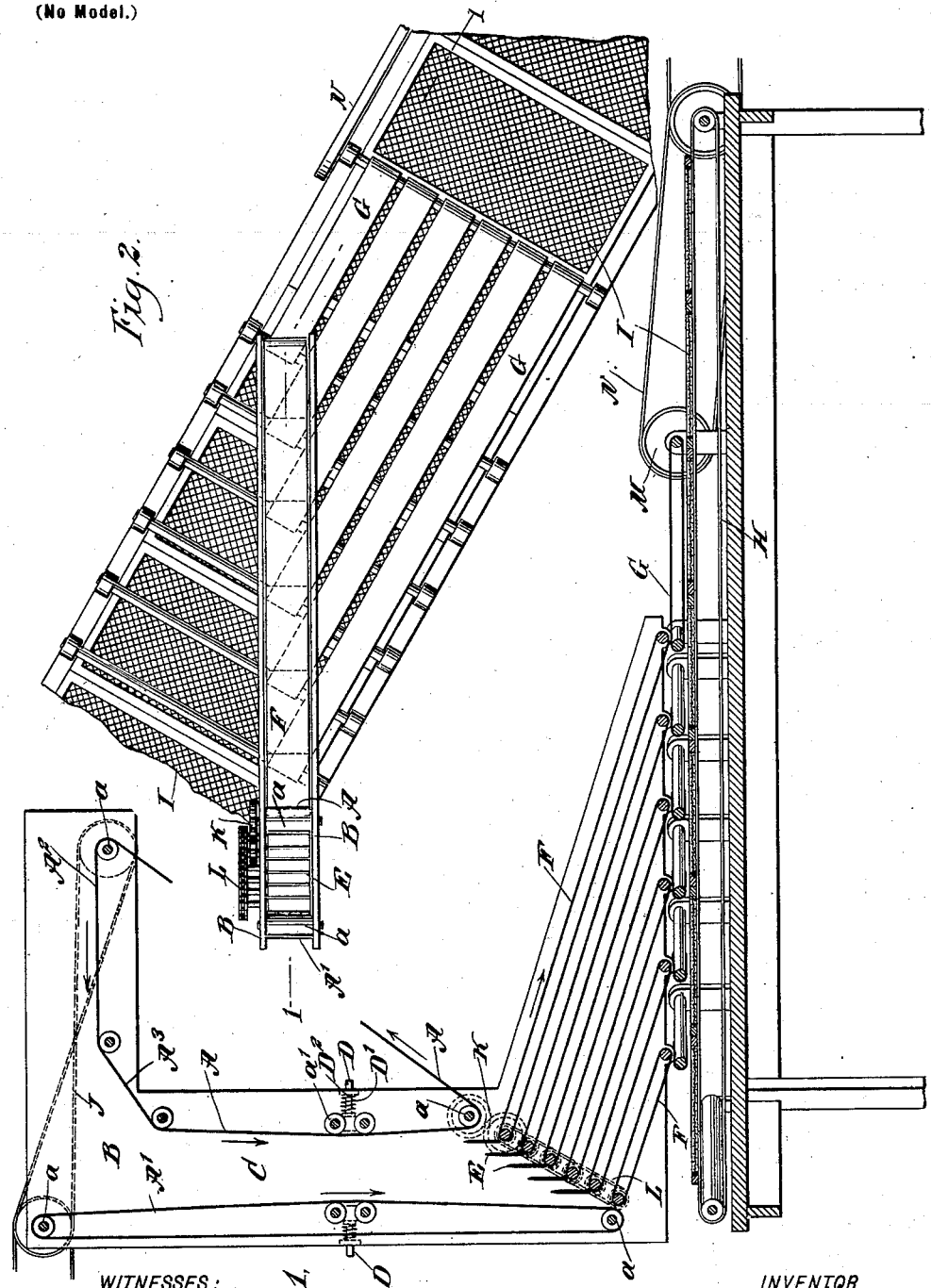

UNITED STATES PATENT OFFICE.

CARL WOLFF, OF NEW YORK, N. Y.

APPARATUS FOR CUTTING GLUE.

SPECIFICATION forming part of Letters Patent No. 654,929, dated July 31, 1900.

Application filed November 17, 1899. Serial No. 737,318. (No model.)

*To all whom it may concern:*

Be it known that I, CARL WOLFF, a subject of the King of Würtemberg, and a resident of the city of New York, borough of Manhattan, in the county and State of New York, have invented a new and Improved Machine for Cutting Glue, Gelatin, and other Substances, of which the following is a full, clear, and exact description.

My invention relates to machines for cutting glue, gelatin, and other substances, and has for its object to provide a simple and very efficient machine for the above-indicated purpose.

The invention will be fully described hereinafter and the features of novelty pointed out in the appended claims.

Reference is to be had to the accompanying drawings, forming a part of this specification, in which similar characters of reference indicate corresponding parts in both the views.

Figure 1 is a sectional elevation of my improved machine on the line 1 1 of Fig. 2, and Fig. 2 is a plan thereof with parts broken away.

The machine comprises a mechanism for feeding the blocks or cakes of glue or gelatin, a cutting mechanism, a conveying mechanism for carrying away the cut slices, and suitable devices, such as drying-frames, for receiving the material from said conveying mechanism.

The feed mechanism consists of two endless belts $A A'$, passing over rollers $a a'$, journaled in the parallel walls B of the machine-frame, the belts being of such width as to extend substantially from one of said walls to the other. The receiving-belt A has an approximately-horizontal portion $A^2$, followed by an incline $A^3$, while the other belt $A'$ projects upwardly beyond the belt A, so as to form a stop for the material and to assist in directing it into the downward channel C, formed between the opposing approximately-vertical runs of the belts $A A'$. A throat is formed at about the center of said channel by mounting the guide-rollers $a'$ on a spring-pressed bar or support D, the tension of the spring $D'$ being capable of adjustment by means of a nut $D^2$. The material fed down the channel C is adapted to be cut into slices by means of a series of knives E, connecting the walls B and arranged stepwise, as shown, so that the knives will begin to cut one after the other and not all together. From the knives E the slices are conveyed downward by superposed inclined belts F, which differ in length, as shown, so that their lower ends are approximately in the same horizontal plane. The material at the lower ends of the belts F passes onto a series of belts G, located side by side (not superposed) and as a rule approximately horizontal. These belts, as shown in Fig. 2, are disposed at an angle to the direction of the belts F. Underneath the belts G is arranged a substantially-horizontal conveyer H, projecting beyond the delivery ends of the belts G and adapted to carry screen-frames I or other devices for receiving the slices from the belts G.

The various belts are driven in the direction indicated by the arrows by any suitable mechanism. As shown, the shaft of one of the rollers $a$ of the belt $A'$ may be a drive-shaft actuating the upper roller $a$ of the belt A by means of a crossed belt J. The lower roller $a$ of the belt A has a gear connection K with the roller for the upper end of the adjacent belt F, and all the belts F are compelled to move in unison by a chain L, engaging sprocket-wheels on the upper rollers. The belts G are driven by a pulley M on the shaft at the delivery end of said belts and a belt N, which connects said shaft with one of the shafts of the conveyer H.

In operation the material passes from the horizontal portion $A^2$ to the inclined portion $A^3$ and to the throat of the channel C, where the two belts A and $A'$ take a firm hold of the material and feed it forcibly downward against the knives or blades E. As these knives are arranged stepwise, with their cutting edges forming an oblique line transverse to the path of the material, it follows that the material will be engaged first by the upper knife only, then by the next knife below, and so on, each knife beginning to cut only after the next knife above has entered the material. With this arrangement the material is little liable to slip or bulge, and the power required to operate the machine is comparatively low. The resistance to the cutting action of the blade is much greater at the beginning of the cut than after the knife has entered the material, and as this greater initial resistance occurs but for one knife at a time the machine can obviously be operated with less power than when, according to the usual arrangement, all the knives start to cut at the same time. The cut slices pass on the belts F and G and onto the screens I, which are removed at the the proper time by an attendant, who also replaces the empty screens at the opposite end of the conveyer H.

The machine is simple, compact, and very efficient.

Having thus fully described my invention, I claim as new and desire to secure by Letters Patent—

1. The combination with the feed mechanism, of a cutting device comprising a plurality of blades arranged stepwise and located in the path of the material laterally of each other, and a plurality of inclined belts, each of which has its receiving end adjacent one of the blades, whereby each slice of the material is carried away from the blades as soon as it is cut, independently of the other slices.

2. The combination of the vertical knives arranged stepwise, and superposed inclined belts whose upper and receiving ends are located adjacent said knives and whose delivery ends are approximately at the same level.

3. The combination of the knives arranged stepwise, the belts each of which has its receiving end located adjacent a knife, and the series of conveying-belts each of which is arranged with its receiving end adjacent the delivery end of one of the first-mentioned belts and at an angle to the plane of the same.

4. The combination of the vertical knives arranged stepwise, mechanism for feeding the material to the knives, the superposed inclined belts the upper ends of which are located adjacent to the knives, while their lower ends are approximately at the same level, and a series of conveying-belts located side by side and arranged at an angle to the plane of the first-mentioned belts, each belt of the second series being in receiving relation to one of the belts of the first series.

5. The combination of the vertical knives arranged stepwise, mechanism for feeding the material to the knives, the superposed inclined belts the upper ends of which are located adjacent to the knives, while their lower ends are approximately at the same level, a series of conveying-belts located side by side and arranged at an angle to the plane of first-mentioned belts, each belt of the second series being in receiving relation to one of the belts of the first series, and a conveyer located under the second series of belts and projecting beyond their delivery ends.

6. In a device for the purpose described, a feeding mechanism consisting of belts one of which has a horizontal run at its receiving end and also a vertical run, and the other of which is provided with a vertical run parallel with the vertical run of the first-named belt and extending above such vertical run whereby to form a stop to direct the material into the channel formed by the parallel vertical runs.

In testimony whereof I have signed my name to this specification in the presence of two subscribing witnesses.

CARL WOLFF.

Witnesses:
JOHN LOTKA,
EVERARD BOLTON MARSHALL.